United States Patent Office 3,181,593
Patented May 4, 1965

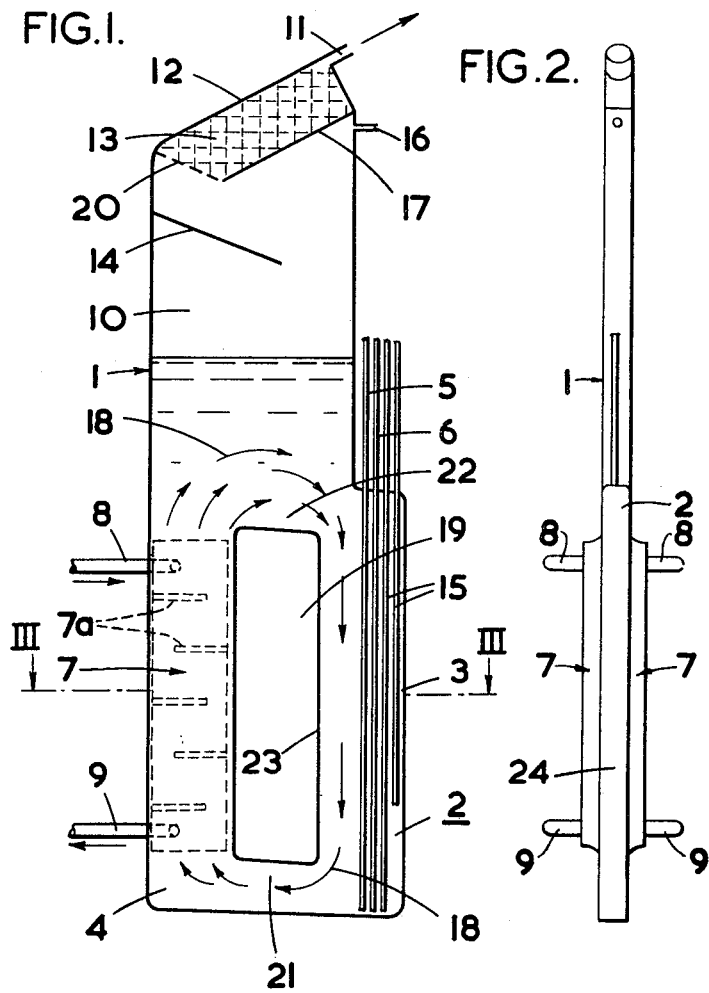
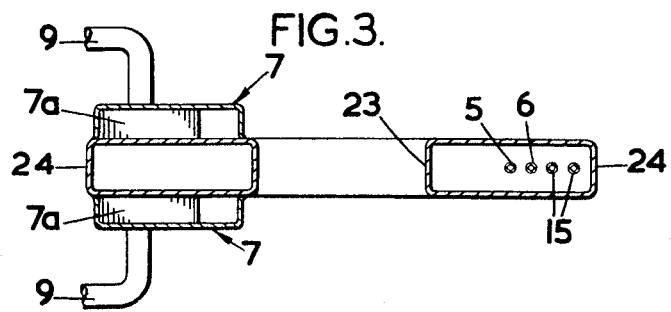

3,181,593
APPARATUS FOR CONCENTRATING SOLUTIONS
John Lindley, Thurso, Caithness, Scotland, assignor to United Kingdom Atomic Energy Authority, London, England
Filed July 5, 1960, Ser. No. 40,622
Claims priority, application Great Britain, July 21, 1959, 24,998/59
3 Claims. (Cl. 159—28)

This invention relates to apparatus for concentrating solutions.

In the processing of solutions containing fissionable material it is desirable to avoid a condition of nuclear criticality in the solution by using apparatus of a selected geometric shape in which one dimension is kept below a specified limit. This limit varies according to the material which the apparatus is to contain but it is small compared with the other dimensions of the apparatus and difficulties arise in inducing circulation in such apparatus.

According to the present invention, a vessel for concentrating solutions is slab shaped and has internally two legs divided from one another except at their ends where they are connected by passages, a liquid inlet and liquid draw-off line in one of said legs, a heater associated with the other of said legs whereby circulation of liquid can be established between the two legs via the passages connecting them, a vapour space above the leg with which the heater is associated, said vapour space having a vapour outlet, and means for disentrainment of liquid from vapour passing to the outlet.

The means for disentrainment may comprise a packing providing an inclined path for vapour passing to the vapour outlet.

To particularise certain aspects of the invention, there is provided a vessel for concentrating solutions of fissionable material which comprises two parallel side walls each of a corresponding configuration composed of rectangularly shaped and extension portions, these side walls being closely spaced, an outer peripheral wall uniting the side walls along their outer perimeters and being interrupted where an outlet is formed at a point on the perimeters of the extension portions of the side walls, an inner peripheral wall uniting the side walls along the outline of a rectangle enclosed by and similar to the rectangularly shaped portions so as to define between the side walls and the inner and outer peripheral walls a containment circuit having interconnected straight legs in communication with the space between the extension portions and the outer peripheral wall which space serves as a vapour collecting zone, a heater for supplying heat to one of the legs of the containment circuit, and an inlet through the outer peripheral wall opening into the other of the legs of the containment circuit.

Apparatus according to the invention will now be described by way of example with reference to the accompanying drawing in which FIG. 1 is a diagrammatic side view in section of an evaporator wherein the walls of the device are represented by solid lines, FIG. 2 is an end view in elevation as seen from the right hand side of FIG. 1 and FIG 3 is a medial horizontal section to a larger scale taken along the lines III—III of FIG. 1, wherein the walls of the evaporator are shown in section.

In the drawing, the illustrated chemical process vessel is a slab-shaped tank 1, that is to say, the side walls are spaced apart for securing the desired geometrically safe shape by a distance which is a very small fraction of the maximum width of the side walls, as is seen clearly in FIG. 2. By means of cut outs 19 in the side walls with an inner peripheral wall 23 uniting the side walls at the edges of these cut outs, or, in the alternative, by means of a solid partition (not shown), a rectangularly shaped lower portion 2 of the tank is formed internally into a liquid containment circuit having two upright straight legs 3, 4 interconnected at their ends by passages 21, 22, the cut outs 19, or the solid partition, as the case may be, having a shape similar to that of the rectangularly shaped lower portion 2 of the tank. An inlet to the containment circuit through the outer peripheral walling 24 of the tank is in the form of an inlet tube 5 entering into the leg 3. Similarly disposed so as to enter into the leg 3 is a liquid draw-off tube 6. Affixed to the tank side walls, one on either side of the leg 4, are steam heater blocks 7, each containing baffle plates, such as 7a, to direct incoming steam in a tortuous flow path in well known manner and each having a steam inlet line 8 and a steam outlet line 9.

A vapour collecting zone 10 communicating with the leg 4 is defined between quadrilaterally shaped extension portions of the tank side walls which portions are contiguous with, and projecting above, the rectangularly shaped lower portion 2. At its uppermost region, the vapour collecting zone leads to an outlet 11 over an upwardly inclined roof 12 and through a disentrainment packing 13. The packing 13 is held in the collecting zone between the roof 12 and an inclined wall 17 and is prevented from becoming displaced by a grid 20 and provides an inclined path for vapour passing to the vapour outlet 11. A baffle 14 is provided in the collecting zone 10 to prevent liquid droplets produced during boiling from direct entry to the packing 13 and pneumercator tubes 15 are provided in the leg 3. A pipe connection 16 allows pressure tapping of the collecting zone 10.

The tank is constructed of titanium walls joined by welding to reduce the danger of leakage, and the packing 13 is of titanium knitmesh.

To operate the apparatus the vapour outlet 11 is connected to a conventional condenser (not shown) in a liquid solution of fissionable material to be concentrated is fed into the tank portion 2 through the inlet tube 5. Steam is fed through the heater blocks 7 via the steam lines 8, 9 so that the liquid is heated and circulates as shown by arrows 18. Vapour is driven off from the liquid and passes to the vapour outlet 11 through the packing 13 (which removes vapour-entrained liquid) and then to the condenser where it is condensed. The change in the specific gravity of the liquid and hence its concentration is measured by means of the pneumercator tubes 15 through which gas is bubbled, the feed pressure of such gas then being a measure of the specific gravity of the liquid. When the desired concentration is reached the steam supply to the heater 7 is shut off and the apparatus is allowed to cool. The concentrated liquid may then be withdrawn through the draw-off tube 6 by suction.

By forming the tank to include a flow circuit, the flow which is freely induced in the liquid by the heater blocks 7 enhances the transfer of heat to the liquid and makes for an efficient concentration process.

I claim:

1. A complete evaporator for the evaporation of solutions of fissionable material comprising a slab-shaped evaporating vessel comprising two flat walls in upright closely spaced parallel relationship, peripheral walling interconnecting the parallel walls to define a vessel for the solution and a vapour collecting chamber within the vessel, a vapour outlet through the peripheral walling extending from the vapour collecting chamber, a liquid inlet through the peripheral walling into the vessel, an upright partition means interconnecting the parallel walls but spaced from the peripheral walling to divide the vessel internally into two upright legs which are open to each other at their ends and each has a cross section in the shape of a rectangle, such rectangular shape having the longer sides thereof formed by the parallel walls, and heating means contiguous and conductively associated with the external surface of the parallel walls in the region of one of the legs to cause circulation of the solution upwardly in said one leg and downwardly in the other leg.

2. An evaporating vessel as claimed in claim 1 wherein the partition means is hollow and apertures are pierced through the parallel walls into the hollow interior of the partition means.

3. An evaporating vessel as claimed in claim 1 wherein a liquid disentrainment section is disposed within the vessel adjacent the vapor outlet.

References Cited by the Examiner

UNITED STATES PATENTS

| | | | |
|---|---|---|---|
| 1,069,394 | 8/13 | Cozzolino | 159—31 X |
| 1,191,108 | 7/16 | Kestner | 159—14 |
| 1,258,562 | 3/18 | Harris | 159—31 |
| 1,693,786 | 12/28 | Isaachsen | 159—45 |
| 1,884,726 | 10/32 | Kermer | 159—27 |
| 2,077,323 | 4/37 | Hendrix | 122—17 |
| 2,408,820 | 10/46 | Stamm | 122—17 |
| 2,562,739 | 7/51 | Risberg | 159—28 X |
| 2,576,496 | 11/51 | Ziegler | 159—28 |
| 2,686,249 | 8/54 | Hoague et al. | 122—408 X |
| 2,761,768 | 9/56 | Diels et al. | 23—266 |
| 2,788,065 | 4/57 | Lockman | 159—20 |
| 2,915,296 | 12/59 | Johnson | 165—183 |
| 3,073,380 | 1/63 | Palmason | 159—28 X |

FOREIGN PATENTS

| | | |
|---|---|---|
| 210,880 | 2/24 | Great Britain. |
| 502,907 | 5/20 | France. |

NORMAN YUDKOFF, *Primary Examiner.*

GEORGE D. MITCHELL, MAURICE A. BRINDISI, CHARLES O'CONNELL, *Examiners.*